United States Patent [19]

Kameda et al.

[11] 3,920,619

[45] Nov. 18, 1975

[54] PROCESS FOR CASTING METHACRYLIC ACID POLYMER PLATE

[75] Inventors: Nobuo Kameda; Suehiro Tayama; Tokuo Tamaki, all of Otake, Japan

[73] Assignee: Mitsubishi Rayon Co., Ltd., Japan

[22] Filed: July 18, 1973

[21] Appl. No.: 380,295

[30] Foreign Application Priority Data
July 27, 1972   Japan.............................. 47-75265

[52] U.S. Cl.................. 260/31.2 R; 260/29.6 TA; 260/29.6 H; 260/29.6 MP; 260/31.2 N; 260/45.7; 260/78.5; 260/80.3 R; 260/80.71; 260/80.8; 260/86.1 R; 260/86.1 E

[51] Int. Cl.²................... C08K 5/09; C08K 5/10; C08F 218/14; C08F 230/00

[58] Field of Search...... 260/31.2, 29.6 TA, 29.6 H, 260/29.6 MP, 45.7 P, 80.3 R, 80.71, 80.8, 86.1 R, 86.1 E, 78.5, 31.2 R, 31.2 N

[56] References Cited
UNITED STATES PATENTS
3,030,327   4/1962   Hosch.............................. 260/45.7 P
3,725,509   4/1973   Kraft et al. .................. 260/29.6 TA FOREIGN PATENTS OR APPLICATIONS
1,122,594   5/1966   United Kingdom

*Primary Examiner*—Joseph L. Schofer
*Assistant Examiner*—Herbert J. Lilling
*Attorney, Agent, or Firm*—Larson, Taylor & Hinds

[57] ABSTRACT

A process for casting a methacrylic acid polymer plate by a bulk polymerization procedure is provided. Methacrylic acid or a mixture predominantly containing methacrylic acid is polymerized in the presence of a stated amount of water. The polymer plate is of improved flame retarding and antistatic properties.

18 Claims, No Drawings

PROCESS FOR CASTING METHACRYLIC ACID POLYMER PLATE

This invention relates to a process for casting a methacrylic acid polymer plate of improved flame retarding and antistatic properties. The methacrylic acid polymer plate is characterized as exhibiting improved flame resistance and generating little or no toxic gas and fumes on burning, as well as having other properties such as transparency, tensile strength and elongation, thermal resistance and processability which are equal to those of conventional methacrylate polymer plates.

In general, a methacrylate polymer plate is produced by a casting procedure wherein methyl methacrylate or a mixture of a predominant amount of methyl methacrylate and a lesser amount of other copolymerizable ethylenically unsaturated compounds such as methyl acrylate or a partially polymerized product thereof is charged into a mold together with a catalytic amount of a radical polymerization initiator such as, for example, azobisisobutyronitrile, and heated for a prescribed period to effect the polymerization. The mold employed is constituted, for example, by a pair of sheets of glass facing each other or by a pair of continuously moving steel belts facing each other, and with sealing gaskets on the edges therebetween.

By the term "methacrylate polymer" used herein is meant a methyl methacrylate homopolymer or a copolymer containing at least 90% by weight, based on the weight of the copolymer, of A methyl methacrylate unit. By the term "methyl methacrylate polymer plate" is "methyl methacrylate polymer cast plate" is meant a plate composed of such a polymer and cast by a casting procedure such as mentioned above.

A methacrylate polymer plate has a variety of uses such as, for example, illuminant coverings, signboards, displays and construction materials, since the polymer plate is capable of being easily processed into a desired shape by thermal forming at 140° to 190°C. However, a methacrylate polymer plate has a serious drawback in that it has poor flame resistance.

In order to impart flame resistance to a methacrylate polymer plate, a flame retardant agent is incorporated into the methacrylate polymer prior to the casting. As a flame retardant agent, a halogen and phosphorus containing compound capable of producing a transparent methacrylate cast plate when incorporated is generally employed. For example, British Pat. No. 1,122,594 discloses the employment of a particular compound containing both phosphorus and bromine or chlorine for imparting flame resistance to a methacrylate polymer plate. By the term "flame resistant methacrylate polymer plate" used herein is meant a methacrylate polymer plate havig an incorporated a flame retardant agent.

It is necessary to incorporate a considerable amount, usually at least 15 parts by weight based on 100 parts by weight of the monomer, of a flame retardant agent in order to obtain the desired flame retarding effect. However, the incorporation of such a considerable amount of a flame retardant agent causes a serious problem. That is, the flame resistant methacrylate polymer plate generates fumes and toxic gases in great quantities and emits an offensive odor when it begins to burn, although a methyl methacrylate polymer cast plate having no flame retardant agent generates fumes and toxic gases in far more reduced quantities.

In general, a polymer of methacrylic acid or a mixture predominantly containing methacrylic acid is neither transparent nor has a compact structure, because the polymer is of low solubility in the monomer, and tends to precipitate readily when produced in the medium of a monomer.

Only a few copolymers of methacrylic acid are transparent and have relatively compact structures, which contain as comonomer a small quantity of styrene, halogen-substituted styrene such as, monochlorostyrene and alkyl-substituted styrene such as $\alpha$-methylstyrene. One typical example of copolymers, which are transparent and have relatively compact structures, is composed of 30 to 80% by weight of styrene and 20 to 70% by weight of methacrylic acid. This copolymer also has poor flame resistance. The larger the proportion of methacrylic acid to the comonomer, the more the copolymer becomes flame-retarding. However, even when a copolymer contains a very great quantity of methacrylic acid, it exhibits no self-extinguishing flame-resistant property. Such a copolymer generates a dense cloud of black smoke on burning.

Now, it has been found that, when methacrylic acid or a mixture containing methacrylic acid is polymerized by a bulk polymerization procedure in the presence of a stated amount water, the resulting polymer has improved flame retarding and antistatic properties and generates little or no toxic gases and fumes on burning. Further, the polymer is transparent and of a compact structure, and has properties such as tensile strength, elongation, thermal resistance and processability which are equal to those of methacrylate polymers.

In accordance with the present invention, there is provided a process for casting a methacrylic acid polymer plate of improved flame retarding and antistatic properties by a bulk polymerization procedure, which comprises polymerizing in a mold a mixture of A. methacrylic acid in an amount of 20 to 100% by weight based on the total weight of the monomer components (A), and (C) below, B. water in an amount of 0.1 to 1 mole per mole of methacrylic acid and at least 1 part by weight based on 100 parts by weight of the monomer components (A), and (C) below, and C. at least one ethylenically unsaturated compound copolymerizable with methacrylic acid and capable of forming a homogeneous, transparent solution when blended with the components (A) and (B) at a temperature of 25°C, in an amount of 0 to 80% by weight based on the total weight of the monomer components (A) and (C).

The amount of water incorporated into the monomer component should be 0.1 to 1 mole, preferably 0.3 to 1.0 mole, per one mole of methacrylic acid, and at least one part by weight, preferably at least 2 parts by weight, based on 100 parts by weight of the monomer components. When the amount of water exceeds 1 mole per mole of methacrylic acid, a polymer plate with the following defects results. First, the polymer is partially released from the mold in the course of casting, which leads to spoiling of the polymer plate's appearance. Secondly, the polymer plate tends to foam when subjected to thermal forming. Thirdly, shaped articles made from the polymer plate by thermal forming are inferior in dimensional stability.

In contrast, when the amount of water is below the given lower limit, a polymer plate with the following defects results. First, the polymer plate is inferior in flame resistance, antistatic property, processability and releasability from a mold. Secondly, the polymer has a structure of reduced compactness. Thirdly, the polymer exhibits an undesirable increase in water absorption.

The incorporation of the stated amount of water has the following desired effects on the resulting polymer plate.

First, when the polymer plate is allowed to approach fire, water contained therein evaporates and retards the temperature elevation of the polymer. Thus, the water prolongs the period from the time when the polymer plate contacts the flame to the time of ignition, and shortens the burning time, i.e. the period of time during which the polymer plate continues to burn after the removal of the flame.

Further, compared to the polymer plate produced by a procedure wherein no water is emloyed, when the polymer plate of the present invention is allowed to burn, it is molten only at in a far more limited area adjacent to fire, the melt drips in a far less amount, and the polymer plate is not greatly deformed. Because, when the water diffuses away from the polymer plate, the polymer is condensed to a some extent and becomes considerably thermal resistant.

Secondly, the water aids production of a compact polymer structure.

Thirdly, the water controls the condensation reaction occurring between functional groups of the polymer and functions as a plasticizer, when the polymer plate is subjected to thermal forming at a temperature of 140° to 190°C. Therefore, the thermal forming can be smoothly effected.

The amount of methacrylic acid employed as a monomer component may be varied within the range from 20 to 100% by weight, preferably from 20 to 70% by weight, based on the total weight of the monomer components. When the amount of methacrylic acid is 100% by weight, the resulting polymer, i.e. polymethacrylic acid, is inferior in thermal forming property of copolymers containing less than 100% by weight of methacrylic acid. Therefore, it is preferable to employ, in addition to methacrylic acid, a suitable amount of other copolymerizable ethylenically unsaturated compounds. The amount of the copolymerizable ethylenically unsaturated compounds employed may be varied within the range from zero to 80% by weight, preferably from 30% to 80% by weight, based on the total weight of the monomer components.

The ethylenically unsaturated compound should be capable of forming a homogeneous, transparent solution when mixed with methacrylic acid and water at a temperature of 25°C in order to produce a polymer plate which is transparent and has a compact structure.

The ethylenically unsaturated compounds may be divided into the following four broad classes.

i. Alkyl acrylates and alkyl methacrylate, both having 1 to 3 carbon atoms in the alkyl moiety, such as for example methyl methacrylate, ethyl methacrylate and methyl acrylate.

ii. Alkyl esters of acrylic acid or methacrylic acid having 4 to 12 carbon atoms in the alkyl moiety, such as butyl methacrylate, 2-ethylhexyl methacrylate, butyl acrylate, cyclohexyl methacrylate, cyclohexyl acrylate, benzyl methacrylate, benzyl acrylate. Halogenated alkyl esters of acrylic acid or methacrylic acid having 2 to 3 carbon atoms in the halogenated moieter, such as 2-chloroethyl methacrylate, 2,3-dibromopropyl methacrylate, 2,3-dibromopropyl acrylate. Alkyl esters of substituted acrylic acid having 1 to 4 carbon atoms in the alkyl moiety, such as methyl α-chloroacrylate. Styrene and alkyl-substituted styrenes having 1 to 4 carbon atoms in the alkyl moiety such as α-methylstyrene, and halogen-substituted styrenes such as monochlorostyrene.

iii. Acrylic acid, acrylamide, acrylonitrile, diacetone acrylamide, maleic acid and itaconic acid.

iv. Methacrylic amide, methacrylonitrile, N-hydroxymethylacrylic amide, 2-hydroxyethyl methacrylate, 2-hydroxyethyl acrylate, glycidyl methacrylate, dimethylaminoethyl methacrylate, diethylaminoethyl methacrylate, N-alkylmaleimide such as N-methylmaleimide, N-arylmaleimide such as N-phenylmaleimide, and metal salts of methacrylic acid or acrylic acid such as sodium methacrylate and calcium methacrylate.

A compound in the group (i) classification may be advantageously employed in any desired amount up to but not more than 80% by weight.

A compound in the group (ii) classification tends to become insoluble in a mixture of methacrylic acid and water and produces no homogeneous solution when employed in a relatively large amount. Therefore, this compound is preferably employed in an amount of not more than 30% by weight.

A compound in the group (iii) classification may also be advantageously employed in any desired amount up to but not more than 80% by weight. However, when this compound is employed in a large amount, the resulting polymer is somewhat poor in thermal resistance and water resistance, i.e. resistance to water absorption and to change in appearance when immersed in water. Therefore, for optimum results, this compound is employed in an amount of not more than 30% by weight or in combination with a compound in the group (i) or (ii) classifications.

Compounds classified as group (iv) result in polymers somewhat poor in water resistance, processability and releasability from a mold when employed in a relatively large amount. This compound is preferably employed in an amount of not more than 20% by weight, more preferably not more than 10% by weight, or in combination with a compound in the group (i) or (ii) classifications.

Some examples of preferred monomeric compositions will be given.

One of the preferred monomeric compositions is composed of:

A. Methacrylic acid in an amount of 20 to 70% by weight, more preferably 20 to 60% by weight, based on the total weight of the monomer components (A) and, (C-1) and (C-2) below;

B. Water in an amount mentioned above;

C-1. Methyl methacrylate in an amount of 30 to 80% by weight, more preferably 30 to 65% by weight, based on the total weight of the monomer components (A), (C-1) and (C-2), and;

C-2. At least one ethylenically unsaturated compound copolymerizable with methacrylic acid and methyl methacrylate and capable of forming a homogeneous, transparent solution when mixed with methacrylic acid, methyl methacrylate and water at a temperature of 25°C in an amount of 0 to 30% by weight based on the total weight of the monomer components (A), (C-1) and (C-2).

This monomeric composition is characterized as containing a large amount of methyl methacrylate as comonomer component (C-1), and results in a colorless, transparent polymer plate particularly superior in thermal resistance as well as flame resistance.

The comonomer component (C-2) may be suitably chosen from compounds hereinbefore classified as groups (i) (except for methyl methacrylate), (ii), (iii) and (iv), depending upon the intended property of the polymer plate. For example, in order to produce a polymer plate with improved flame resistance, compounds hereinbefore classified as group (iii) such as, for example, acrylic acid, acrylamide and methyl acrylate are preferable. Of these, acrylamide is most preferable. In order to produce a polymer plate with improved water resistance, compounds hereinbefore classified as group (ii) such as, for example, butyl methacrylate, cyclohexyl methacrylate, styrene and monochlorostyrene are preferable. Of these, styrene is most preferable.

Thus, in order to produce a colorless, transparent polymer plate superior in thermal resistance, water resistance as well as flame resistance, the following monomeric composition is preferble.

A. Methacrylic acid in an amount of 20 to 60% by weight, more preferably 30 to 60% by weight based on the total weight of the monomer components;

B. Water in an amount of 0.1 to 1 mole, more preferably 0.3 to 1 mole, per mole of methacrylic acid and at least 1 part by weight, more preferably at least 2 parts by weight based on the total weight of the monomer components;

C-1. Methyl methacrylate in an amount of 30 to 65% by weight based on the total weight of the monomer components;

C-2. Acrylamide in an amount of 3 to 15% by weight based on the total weight of the monomer components; and C-3. Styrene in an amount of 3 to 15% by weight based on the total weight of the monomer components.

In the case where a monomeric composition containing a large amount of methacrylic acid is employed, the resulting polymer generates only a reduced amount of flammable decomposed gases when allowed to approach a fire or burn, because the water contained therein is released therefrom and the polymer is condensed. In addition to the water, carbon dioxide gases are expected to be released therefrom. Further, such a polymer is excellent in thermal resistance.

Monomers of the group (iii) classification hereinbefore mentioned such as acrylic acid, acrylamide and methyl acrylate also have the following effects on the polymer. These monomers enhance the condensation of polymers and control the depolymerization of the polymers, both of which occur when the polymers are allowed to approach a fire or burn. Further, these reduce the generation of flammable decomposed gases. From a viewpoint of flame resistance, a monomeric composition containing not less than 50% by weight of methacrylic acid and not more than 50% by weight of acrylamide is most preferable.

The monomeric composition, which is polymerized by the process of the invention, may further contain a small amount of at least one copolymerizable compound having at least two ethylenical unsaturations. This monomeric composition results in a polymer plate superior in solvent resistance as well as the properties intended by the process of the invention because the compound of at least two ethylenical unsaturations forms a crosslinkage between polymer molecules. This compound includes, for example, glycol dimethacrylate, glycol diacrylate, divinylbenzene, vinyl methacrylate, allyl methacrylate, diallyl phthalate and allyl acrylate. The amount of this compound is 0.01 to 5% by weight, preferably 0.05 to 1.0% by weight, based on the total weight of the monomer components.

The monomeric composition may further contain a small amount of a flame retardant agent in order to produce a polymer plate having a more enhanced flame resistance. Even when a flame retardant agent is employed in a reduced amount, e.g. one-eighth to one-third of the amount employed for a flame resistant methacrylate polymer plate, the resulting polymer plate exhibits a more enhanced flame resistance.

The flame retardant agent employed may be chosen from those conventionally employed for flame resistant methacrylate polymer plates. Such flame retardant agents include, for example, neutral alkyl esters and neutral aryl esters of orthophosphoric acid, said alkyl moiety having 1 to 8, preferably 2 to 4 carbon atoms and said aryl moiety having 6 to 14, preferably 6 to 8 carbon atoms, such as triethyl phosphate, trimethyl phosphate, tri-n-propyl phosphate, tributyl phosphate, tricresyl phosphate and triphenyl phosphate; neutral halogenated alkyl esters of orthophosphoric acid, said alkyl moiety having 2 to 6, preferably 2 to 3 carbon atoms, such as tris-chloroethyl phosphate, tris-bromoethyl phosphate, tris-dichloropropyl phosphate tris-dibromopropyl phosphate and tris-bromochloropropyl phosphate; tris-halogenated alkyl phosphonates, said alkyl moiety having 2 to 6, preferably 2 to 3 carbon atoms, such as tris-chloroethyl phosphonate, tris-dichloroethyl phosphonate, tris-dibromopropyl phosphonate, tris-bromochloropropyl phosphonate and tris-dichloropropyl phosphonate; and halogenated alkyl polyphosphonates, said alkyl moiety having 2 to 6, preferably 2 to 3 carbon atoms, for example, halogenated alkyl bis-phosphonates expressed by the formula:

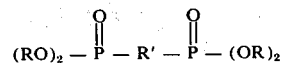

wherein R is a halogenated alkyl having 2 or 3 carbon atoms and R' is an alkylene or halogenated alkylene having 2 or 3 carbon atoms, such as 0,0,0',0'-tetrakis(2-bromo-3-chloropropyl)-2-bromopropylene bis-phosphonate, and halogenated alkyl polyphosphonates of the formula:

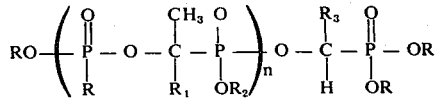

wherein R and $R_2$ are chloroethyl or chloroispropyl, $R_1$ is hydrogen, methyl or ethyl, $R_3$ is methyl or ethyl and n is an integer of 1 to 100, such as "Phosgard C-22-R" (supplied by Monsanto Chemical Co., U.S.A.) of the formula:

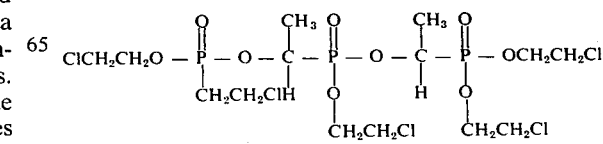

Of these compounds, those containing bromine are preferable, such as tris-dibromopropyl phosphate. Also, halogenated alkyl polyphosphonates expressed by the above formula, the integer "$n$" being within the range of 1 to 100, and halogenated alkyl bisphosphonates expressed by the above formula are preferable.

The amount of these flame retardant agents employed may be varied depending upon the particular flame retardant agent, the particular monomeric composition and the intended extent of flame resistance, but usually within the range from 1 to 25 parts by weight based on 100 parts by weight of the monomer components. If these flame retardant agents are employed, an enhanced flame resistance is obtainable even when the amount of methacrylic acid in the monomeric composition is reduced.

When the flame retardant agents are employed, the amount of water incorporated into the monomer components is not necessarily below 1 mole per mole of methacrylic acid, but may be increased up to the saturation amount, i.e. the maximum amount soluble in a mixture of the monomeric composition and the fire retardant agent at a temperature of 25°C.

Thus, the following monomeric composition is preferable when a flame retardant agent is employed.

A. Methacrylic acid in an amount of 10 to 60% by weight, more preferably 15 to 40% by weight;[1]

B. Water in an amount of 1 to 14.6 parts by weight, more preferably 4 to 10 parts by weight;[2]

(C-1) Methyl methacrylate in an amount of 30 to 80% by weight, more preferably 40 to 80% by weight;[1]
(C-2) Acrylamide in an amount of 3 to 15% by weight;[1]
(C-3) Styrene in an amount of 0 to 15% by weight;[1] and
(D) Flame retardant agent selected from trialkyl phosphates, the alkyl moiety having 1 to 8, preferably 2 to 4 carbon atoms, triaryl phosphates, the aryl moiety having 6 to 14, preferably 6 to 8 carbon atoms, tris-halogenated alkyl phosphate, the alkyl moiety having 2 to 6, preferably 2 to 3 carbon atoms, tris-halogenated alkyl phosphate, the alkyl moiety having 2 to 6, preferably 2 to 3 carbon atoms, and halogenated alkyl polyphosphonate, the alkyl moiety having 2 to 6, preferably 2 to 3 carbon atoms, in an amount of 1 to 25 parts by weight.[2]

[1] % by weight based on the total weight of the monomer components (A), (C-1), (C-2) and (C-3).
[2] parts by weight based on 100 parts by weight of the monomer components (A), (C-1), (C-2) and (C-3).

Further, the monomeric composition, which is employed in the process of the invention, may contain a suitable amount of a particular organic compound which is generally known as a plasticizer for various synthetic polymer resins. The incorporation of the particular organic compound results in a polymer plate resembling opal.

In general, a methacrylate polymer plate of a flame resistant methacrylate polymer plate resembling opal is used as an illuminant covering. Such a plate, resembling opal, is manufactured by a process wherein a monomeric composition having additives such as polystyrene, styrene-methyl methacrylate copolymer, titanium dioxide, barium sulfate and the like incorporated therein is polymerized in a mold. When such additives are incorporated into the monomeric composition of the invention, it is difficult to obtain a desired opal appearance.

Organic compounds used for imparting an opal appearance to the polymer plate of the invention should be soluble in a mixture of the monomer components and water or a mixture of the monomer components, water and a flame retardant agent, but, incapable of dissolving, non-reactive with and non-copolymerizable with the resulting polymer.

The organic compounds include, for example, dialkyl esters of phthalic acid, having 20 to 34 carbon atoms in the molelcule, such as dioctyl phthalate, diisodecyl phthalate and dicyclohexyl phthalate; dialkyl esters of dibasic fatty acid, having 18 to 36 carbon atoms in the molecule, such as isodecyl succinate, dioctyl adipate, dioctyl sebacate and dioctyl tetrahydrophthalate; and alkyl esters of monobasic fatty acid, having 20 to 40 carbon atoms in the molecule, such as butyl oleate. Of these compounds, the dialkyl esters of dibasic acid such as dioctyl adipate and dioctyl sebacate are preferable.

These organic compounds may be employed in an amount of 1 to 8 parts by weight, preferably 1 to 5 parts by weight based on the total weight of the monomeric composition.

A polymer plate having these organic compounds incorporated therein is optically homogeneous, and opalescent. The organic compound incorporated in the polymer plate does not migrate to the surface of the polymer plate, and has little or no influence upon the thermal resistance and flame resistance of the polymer plate. Even if these organic compounds are employed in the process of casting conventional methacrylate polymer plate, a desired opal plate is not obtainable.

The monomeric composition, which comprises methacrylic acid, water and, if desired, other copolymerizable ethylenically unsaturated compounds, flame retardant agent and the organic compound mentioned above is charged into a mold together with a catalytic amount of polymerization initiator. Thereafter, the monomeric composition is heated preferably at temperatures of 40° to 120°C for 20 minutes to 20 hours to effect the polymerization. The heating may be carried out more preferably in two stages, for example, first at a temperature of 40° to 80°C over a period of 30 minutes to 20 hours and then at a temperature of 90° to 120°C over a period of 20 minutes to 3 hours. A mold of any type conventionally employed for casting methacrylate polymer plate may be used.

Polymerization initiators of the type capable of being activated by heat are preferably employed. Such polymerization initiators include, for example, 2,2'-azobisisobutyronitrile, 2,2'-azobis(2-amidinopropane)-hydrochloride, 2,2'-azobis(4-methoxy-2,4-dimethylvaleronitrile, 2,2'-azobis(2,3,3-trimethylbutyronitrile), 2,2'-azobis(2,4,4-trimethylvaleronitrile), 2,2'-azobis(2,4-dimethylvaleronitrile), 1,1'-azobis(cyclohexanecarbonitrile), 2,4-dichlorobenzoyl peroxide, diisopropylperoxy dicarbonate and acetyl cyclohexyl sulfonyl peroxide. The amount of initiator employed may be varied within the range from 0.005 to 0.05% by weight based on the total weight of the monomer components.

Suitable amounts of additives may be incorporated into the monomeric mixture, such as dyestuffs, pigments, ultraviolet absorbers and heat stabilizers. A releasing agent may also be employed in an amount of 0.1 to 6% by weight, preferably 0.2 to 4% by weight, based on the total weight of the monomer components. A preferable releasing agent is alkyl acid phosphate having 2 to 12 carbon atoms in the alkyl moiety for example, butyl acid phosphate and 2-ethylhexyl acid phosphate.

The polymer plate manufactured by the process of the invention may be formed into an article of any desired shape. The forming is performed at a temperature of 140° to 190°C, preferably 150° to 180°C. The polymer plate should be heated to the forming temperature as rapidly as possible and immediately thereafter shaped into the article within the shortest possible time. When the polymer plate is exposed to heat for a long time, it becomes difficult to perform the forming and forms tend to appear on the polymer plate. This is because water contained in the polymer plate diffuses away therefrom and condensation reaction takes place.

A shaped article made from the polymer plate exhibits an improved thermal resistance due to the fact that the polymer is condensed to some extent during the forming procedure. Although a shaped article of a conventional methacrylate polymer plate is usually distorted at a temperature of approximately 85°C, a shaped article of the polymer plate of the invention is not distorted even at a temperature of 100°C.

EXAMPLES 1 – 4

To 100 parts of a monomer mixture of methyl methacrylate and methacrylic acid in proportions as indicated in Table I, were added water in a proportion of 1 mole per mole of the methacrylic acid, 0.05 parts of azobisisobutyronitrile and 0.2 parts of butyl acid phosphate as a releasing agent.

The mixture was subjected to a reduced pressure to remove air dissolved therein, and placed in a mold comprising two sheets of glass spaced apart from each other by 3.8 mm. The mold and the contents were immersed in a water bath at a temperature of 55°C for 6 hours, and then heated in hot air at a temperature of 100°C for 3 hours to complete the polymerization. After cooling, a polymer plate having a thickness of 3 mm was removed from the mold. Properties of the products are shown in Table I.

Each of the products was rubbed with a cotton cloth and when ash was brought into proximity with them a considerable amount of ash was attracted to the plate made of 100% methyl methacrylate (Control Example 1), whereas such attractions were not observed with any of the other plates.

The procedures of each of Examples 1 through 4 were repeated, except that the process was carried out in the absence of water, a chalk-like polymer was obtained.

Table I

| Example No. | Monomer composition | | Water (parts) | Deflection temperature (°C) | Flexural strength (kg/mm²) | Optical Properties | | Flammability (Self-extinguishing time)* |
|---|---|---|---|---|---|---|---|---|
| | Methacrylic acid (%) | Methyl methacrylate (%) | | | | Total luminous transmittance (%) | Haze (%) | |
| Control Example 1 | — | 100 | — | 101 | 14.0 | 93.2 | 0.9 | Burning (Burning rate 1.5 inches/m) |
| 1 | 40 | 60 | 8.4 | 100 | 13.2 | 93.1 | 1.2 | Burning (Burning rate 0.245 inch/m) |
| 2 | 60 | 40 | 12.6 | 102 | 15.2 | 93.0 | 1.2 | 4'10" self-extinguishing |
| 3 | 80 | 20 | 16.8 | 97 | 14.6 | 93.0 | 1.2 | 3'30" self-extinguishing |
| 4 | 100 | — | 21.0 | 98 | 16.3 | 92.9 | 1.1 | 2'00" self-extinguishing |

*Self-extinguishing time: The time during which the flame travels from a point one inch from the ignited end of the test specimen to the point where the flame extinguishes itself.

The invention will be specifically illustrated by the following Examples, in which all parts and percentages are by weight unless otherwise specified. The mold employed was formed by two parallel sheets of glass separated by a resilient gasket around their peripheries. Properties of the products were determined by the methods as noted below:

| | |
|---|---|
| Total luminous transmittance and haze | ASTM D1003-59T-A |
| Flexural strength | BS 1330 |
| Tensile strength and elongation | ASTM D638-56T |
| Deflection temperature | ASTM D648 |
| Flammability | ASTM D635-56T |
| Oxygen index | ASTM D2863-70 |

EXAMPLES 5 – 14

To 100 parts of each of the monomer mixtures indicated in Table II, were added an indicated amount of water, 0.05 parts of azobis-2,4-dimethylvaleronitrile and 0.3 parts of butyl acid phosphate. The mixture was placed between two sheets of glass spaced apart from each other by 2.6 mm, and heated in a water bath at a temperature of 50°C for 6 hours and in hot air at a temperature of 100°C for 3 hours to produce a polymer plate of 2 mm in thickness. Properties of the products are shown in Table II. When the results shown in Table II are compared with those in Table I, it can be seen that with the additional use of acrylic acid and/or methyl acrylate, improved flame-resistant properties are obtained.

Each of the polymer plates so obtained was formed at a resin temperature of 170°C into a hat shaped article of 100 mm in diameter and 50 mm in height. The forming operation was readily carried out with no difficulty. The article was heat treated in air at temperature of 170°C. for 1 hour. Flammability, flexural strength and percent of loss in weight during the heat treatment are shown in Table III. Burning was accompanied by only a minor amount of fumes, as is the case when polymethyl methacrylate burns. Upon ash tests before and after the heat treatment, all the rubbed samples did not attract ash placed at least 5 mm away, indicating that they were antistatic.

EXAMPLES 15–19

Effects of methyl acrylate, acrylic acid, acrylic amide, acrylonitrile and diacetone acrylic amide as a third component were compared by following the general procedure described in Examples 5–14 to prepare polymer plates of 2 mm thickness. The amount of water used was 0.8 mole per mole of methacrylic acid.

Proportion of the monomer employed and properties of the resulting products are shown in Table IV, and on samples heat treated in air at a temperature of 170°C for one hour, loss in weight during the heat treatment, flexural strength and flammability of the products are shown in Table V. From these results, it will be seen that heat-resistant and flame-retarding properties are especially improved with acrylic amide as a third component.

Table II

| Example No. | Monomer composition | | | | Water (parts) | Water (mole/mole of methacrylic acid) | Deflection temperature (°C) | Flexural strength (kg/mm²) | Optical properties | | Flammability (Burning time**) |
|---|---|---|---|---|---|---|---|---|---|---|---|
| | Methacrylic acid (parts) | Acrylic acid (parts) | Methyl methacrylate (parts) | Methyl acrylate (parts) | | | | | TLT* (%) | Haze (%) | |
| 5 | 60 | 20 | 20 | — | 12.6 | 1.0 | 87.2 | 15.4 | 92.5 | 1.0 | 20" Non-burning |
| 6 | 50 | 20 | 30 | — | 10.5 | 1.0 | 84.5 | 14.5 | 92.8 | 1.0 | 1'05" ditto |
| 7 | 40 | 20 | 40 | — | 8.4 | 1.0 | 80.0 | 14.3 | 93.0 | 0.9 | 1'20" ditto |
| 8 | 50 | — | 30 | 20 | 10.5 | 1.0 | 82.0 | 14.0 | 92.0 | 1.2 | 2'10" ditto |
| 9 | 50 | 10 | 30 | 10 | 10.5 | 1.0 | 83.0 | 12.2 | 93.0 | 0.8 | 48" ditto |
| 10 | 50 | 10 | 30 | 10 | 6.3 | 0.6 | 91.8 | 13.2 | 93.0 | 0.8 | 55" ditto |
| 11 | 50 | 10 | 40 | — | 10.5 | 1.0 | 92.6 | 12.4 | 93.0 | 0.7 | 1'17" ditto |
| 12 | 50 | 10 | 40 | — | 6.3 | 0.6 | 101.3 | 12.9 | 93.0 | 0.8 | 1'19" ditto |
| 13 | 40 | 10 | 40 | 10 | 6.7 | 0.8 | 90.0 | 13.5 | 93.0 | 0.8 | 1'15" ditto |
| 14 | 40 | 10 | 40 | 10 | 5.0 | 0.6 | 93.0 | 14.3 | 93.0 | 0.8 | 1'20" ditto |

TLT: Total luminous transmittance.
**Burning time: The period of time during which the specimen continues to burn after the removal of the burner flame.

Table IV

| Example No. | Monomer composition (by parts) | | | Water (parts) | Deflection temperature (°C) | Flexural strength (kg/mm²) | Optical properties | | Flammability (Burning time) |
|---|---|---|---|---|---|---|---|---|---|
| | Methacrylic acid | Methyl methacrylate | Third monomer | | | | TLT (%) | Haze (%) | |
| 15 | 50 | 40 | Methylacrylate 10 | 8.4 | 97.0 | 11.9 | 93.2 | 0.9 | 2'15" Nonburning |
| 16 | 50 | 40 | Acrylic acid 10 | 8.4 | 100.5 | 12.9 | 93.1 | 0.8 | 1'20" ditto |
| 17 | 50 | 40 | Acrylic amide 10 | 8.4 | 113.0 | 16.4 | 92.9 | 1.0 | 1'16" ditto |
| 18 | 50 | 40 | Acrylonitrile 10 | 8.4 | 93.0 | 14.4 | 93.0 | 0.9 | 1'10" ditto |
| 19 | 50 | 40 | Diacetone acrylic amide 10 | 8.4 | 103.2 | 12.7 | 93.2 | 0.8 | 1'36" ditto |

Table III

| Example No. | Loss in weight (%) | Flexural strength (kg/mm²) | Flammability (Burning time) | |
|---|---|---|---|---|
| 5 | 4.17 | 12.6 | 25" | Nonburning |
| 6 | 3.86 | 13.9 | 1'07" | ditto |
| 7 | 3.17 | 14.4 | 1'30" | ditto |
| 8 | 5.0 | 15.1 | 4'20"* | Self-extinguishing |
| 9 | 3.72 | 14.7 | 1'18" | Nonburning |
| 10 | 2.30 | 17.5 | 1'20" | ditto |
| 11 | 2.95 | 16.9 | 1'23" | ditto |
| 12 | 2.23 | 18.3 | 1'28" | ditto |
| 13 | 2.30 | 17.2 | 1'33" | ditto |
| 14 | 2.05 | 17.5 | 1'40" | DITTO |

*Self-extinguishing time

Table V

| Example No. | Loss in weight (%) | Flexural strength (kg/mm²) | Flammability (Burning time) | |
|---|---|---|---|---|
| 15 | 2.92 | 15.5 | 2'05" | Self-extinguishing |
| 16 | 2.52 | 17.0 | 1'23" | Nonburning |
| 17 | 2.70 | 14.1 | 1'20" | ditto |
| 18 | 2.55 | 16.8 | 1'21" | ditto |
| 19 | 3.40 | 14.8 | 1'56" | ditto |

EXAMPLES 20 – 22

Using a mixture essentially consisting of 35 parts of methacrylic acid, 55 parts of methyl methacrylate, 10 parts of acrylic amide, 7 parts of water (i.e. 0.96 mole of water per mole of the methacrylic acid), 0.03 parts of azobisisobutyronitrile and 0.5 parts of butyl acid phosphate, the procedure described in Examples 1 to 4 was repeated to prepare a polymer plate of 3 mm thickness (Example 20).

The above procedure was repeated twice except that the 55 parts of methyl methacrylate was replaced by 45 parts of methyl methacrylate plus 10 parts of cyclohexyl methacrylate (Example 21) and styrene (Example 22) respectively.

Table VI shows properties of the products, and Table VII % of change in weight of the products with time when kept in water at 30°C, in air at 23°C and under relative humidities of 100, 65 and 30%, and in a desiccator containing calcium chloride. The results shown in Table VII will suggest that the products have an equilibrium water content under relative humidities of about 40 to 60%. Table VII further indicates that water-resistance of the product will be further improved by replacing a part of the methyl methacrylate by cyclohexyl methacrylate and/or styrene.

II 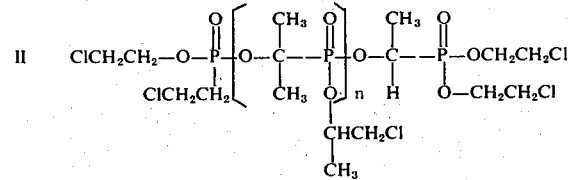

in which $n$ is an integer, and which had an average molecular weight of about 3000 (Example 27) was added to the monomer mixture. Properties of the products so obtained are shown in Table VIII. When compared with the product obtained in Example 22, having an oxygen index of 23.0, each of the products obtained in these Examples had an increased oxygen index. When tested by a method in accordance with ASTM D635-56T, the specimen ceased to burn immediately after the removal of the burner flame.

Table VI

| | Monomer composition | | | | | Deflection temperature (°C) | Tensile properties | | Optical properties | | Flame-resistance (oxygen index) |
|---|---|---|---|---|---|---|---|---|---|---|---|
| Example No. | Methacrylic acid (parts) | Methyl methacrylate (parts) | Cyclohexyl methacrylate (parts) | Styrene (parts) | Acrylic amide (parts) | Water (parts) | | Strength (kg/mm²) | Elongation (%) | TLT (%) | Haze (%) | |
| 20 | 35 | 55 | — | — | 10 | 7 | 104.2 | 9.30 | 3.1 | 92.9 | 0.7 | 23.5 |
| 21 | 35 | 45 | 10 | — | 10 | 7 | 108.0 | 8.80 | 3.0 | 92.5 | 0.8 | 23.0 |
| 22 | 35 | 45 | — | 10 | 10 | 7 | 110.0 | 9.50 | 3.1 | 92.5 | 0.8 | 23.0 |

Table VII

| | | % Change in weight After | | | | |
|---|---|---|---|---|---|---|
| Conditions | Ex. No. | 1 day | 5 days | 10 days | 20 days | 30 days |
| In water at 30°C | 20 | 1.1 | 3.3 | 5.8 | 11.0 | 13.2 |
| | 21 | 0.7 | 2.1 | 3.5 | 5.3 | 6.5 |
| | 22 | 0.6 | 1.6 | 2.4 | 3.5 | 4.0 |
| In air at 23°C and 100% RH* | 20 | 0.2 | 0.9 | 1.5 | 2.5 | 3.2 |
| | 21 | 0.1 | 0.6 | 1.1 | 1.8 | 2.1 |
| | 22 | 0.1 | 0.5 | 0.8 | 1.4 | 1.7 |
| In air at 23°C and 65% RH* | 20 | 0.1 | 0.3 | 0.5 | 0.7 | 0.7 |
| | 21 | 0.1 | 0.2 | 0.4 | 0.6 | 0.7 |
| | 22 | 0.1 | 0.2 | 0.4 | 0.5 | 0.6 |
| In air at 23°C and 30% RH* | 20 | −0.3 | −0.7 | −1.0 | −1.4 | −1.6 |
| | 21 | −0.2 | −0.4 | −0.6 | −0.8 | −0.9 |
| | 22 | −0.2 | −0.4 | −0.6 | −0.8 | −0.9 |
| In desiccator containing CaCl₂ at 23°C | 20 | −0.6 | −1.3 | −1.9 | −2.5 | −2.7 |
| | 21 | −0.4 | −0.9 | −1.3 | −1.7 | −2.0 |
| | 22 | −0.4 | −0.9 | −1.3 | −1.7 | −2.0 |

*RH: Relative humidities

EXAMPLES 23 – 27

In each of these Examples, the procedure of Example 22 was repeated with the exception that 10 parts of a flame-retarding agent, tributyl phosphate (Example 23), tridichloropropyl phosphate (Example 24), trisdibromopropyl phosphate (Example 25), "Phosgard C-22-R" of the formula:

I 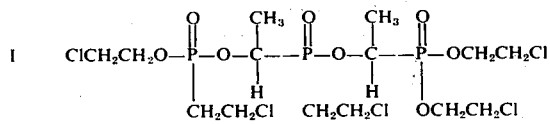

and supplied by Monsant Chemical Co., U.S.A. (Example 26), or a compound of the formula:

Table VIII

| Example No. | Flame retardant | Deflection temperature (°C) | Optical properties | | Fire resistance |
|---|---|---|---|---|---|
| | | | TLT* (%) | Haze (%) | Oxygen index |
| 23 | Tributyl phosphate | 93.4 | 92.6 | 0.7 | 25.5 |
| 24 | Trisdichloropropyl phosphate | 95.0 | 92.6 | 0.7 | 25.5 |
| 25 | Trisdibromopropyl phosphate | 97.0 | 92.2 | 1.1 | 30.0 |
| 26 | I | 96.0 | 92.7 | 1.0 | 27.0 |
| 27 | II | 102.0 | 92.8 | 0.8 | 27.5 |

*TLT: Total luminous transmittance.

EXAMPLES 28 – 33

Following the general procedure as described in Examples 1 to 4, a polymer plate having a thickness of 3 mm was prepared from a mixture of 50 parts of methacrylic acid 50 parts of methyl methacrylate 7.5 parts of water, 10 parts of trisdibromopropyl phosphate 0.02 parts of azibisisobutyronitrile and 0.3 parts of butyl acid phosphate (Example 28).

In order to evaluate effects of the addition of methyl acrylate (Example 29), acrylic acid (Example 30), acrylic amide (Example 31), acrylonitrile (Example 32) and diacetone acrylic amide (Example 33) as a third monomer the above procedure was repeated except that the 50 parts of methyl methacrylate were replaced by 40 parts of methyl methacrylate plus 10 parts of each of the third monomers.

The results are shown in Table IX, from which it will be seen that heat and fire resistances are particularly improved with acrylic amide as a third component. Upon making the ash test all the samples rubbed with a cotton cloth did not attract ash placed at least 3 mm away.

Table IX

| Example No. | Monomer composition | | | Water (parts) | Trisdibromopropyl phosphate (parts) | Deflection temperature (°C) | Optical properties | | Flame-resistance (oxygen index) |
|---|---|---|---|---|---|---|---|---|---|
| | Methacrylic acid (parts) | Methyl methacrylate (parts) | Third monomer (parts) | | | | TLT (%) | Haze (%) | |
| 28 | 50 | 50 | — | 7.5 | 10 | 97.0 | 93.0 | 1.1 | 28.0 |
| 29 | 50 | 40 | Methyl acrylate 10 | 7.5 | 10 | 85.0 | 93.1 | 1.0 | 29.0 |
| 30 | 50 | 40 | Acrylic acid 10 | 7.5 | 10 | 87.0 | 93.0 | 0.9 | 30.5 |
| 31 | 50 | 40 | Acrylic amide 10 | 7.5 | 10 | 96.0 | 92.8 | 1.2 | 31.0 |
| 32 | 50 | 40 | Acrylonitrile 10 | 7.5 | 10 | 80.0 | 92.9 | 1.1 | 31.0 |
| 33 | 50 | 40 | Diacetone acrylic amide 10 | 7.5 | 10 | 88.0 | 93.1 | 0.9 | 29.5 |

EXAMPLE 34

Following the general procedure as described in Examples 1 to 4, a polymer plate of 3 mm thickness was prepared from a mixture essentially consisting of 35 parts of methacrylic acid, 55 parts of methyl methacrylate, 9 parts of water and 10 parts of trisdibromopropyl phosphate. The polymer plate thus obtained had a deflection temperature of 91.2°C and an oxygen index of 31.0. The polymer plate and the plate obtained in Example 25 were tested for changes in weight with time in water at 25°C, in air at 23°C and under relative humidities of 100, 65 and 30%, and in a desiccator containing calcium chloride at 23°C. The results are shown in Table X, from which it is apparent that these polymer plates have an equilibrium water content under relative humidities of about 40 to 60% and that water resistance is improved by addition of styrene.

Table X

| Conditions | Ex. No. | % Change in Weight After | | | | |
|---|---|---|---|---|---|---|
| | | a day | 5 days | 10 days | 20 days | 30 days |
| In water at 25°C | 34 | 0.7 | 2.0 | 3.2 | 5.0 | 6.7 |
| | 25 | 0.5 | 1.2 | 1.7 | 2.5 | 3.0 |
| At 23°C and 100% RH* | 34 | 0.2 | 0.5 | 0.9 | 1.5 | 1.85 |
| | 25 | 0.15 | 0.3 | 0.7 | 1.15 | 1.25 |
| at 23°C and 65% RH* | 34 | 0.1 | 0.2 | 0.25 | 0.4 | 0.5 |
| | 25 | 0.1 | 0.2 | 0.25 | 0.4 | 0.5 |
| At 23°C and 30% RH* | 34 | −0.2 | −0.4 | −0.65 | −1.0 | −1.2 |
| | 25 | −0.1 | −0.25 | −0.4 | −0.6 | −0.85 |
| In a desiccator containing CaCl₂, at 23°C | 34 | −0.4 | −0.9 | −1.3 | −1.7 | −2.0 |
| | 25 | −0.2 | −0.5 | −0.75 | −1.1 | −1.4 |

*RH: Relative humidities

EXAMPLES 35 – 38

The general procedure as described in Examples 1 through 4 was repeated using a mixture of 15 parts of methacrylic acid, 75 parts of methyl methacrylate, 10 parts of acrylic amide, 5 parts of water and 0, 5, 10 or 15 parts of trisdibromopropyl phosphate. Properties of the polymer plates so obtained are shown in Table XI.

Table XI

| Example No. | Trisdibromopropyl phosphate (parts) | Deflection temperature (°C) | Optical properties | | Oxygen index |
|---|---|---|---|---|---|
| | | | TLT* (%) | Haze (%) | |
| 35 | 0 | 96.6 | 92.7 | 0.8 | 22.0 |
| 36 | 5 | 94.9 | 92.6 | 0.9 | 26.5 |
| 37 | 10 | 88.5 | 92.7 | 0.8 | 29.0 |
| 38 | 15 | 82.7 | 92.8 | 0.8 | 29.5 |

*TLT: Total luminous transmittance

CONTROL EXAMPLES 2 – 6

To a mixture containing 90 parts of methyl methacrylate and 10 parts of methacrylic acid, were added 0.05 parts of azobisisobutyronitrile, 0.2 parts of butyl acid phosphate and one or more flame-retardants in amounts as indicated in Table XII below. The resulting mixture was placed between two sheets of glass spaced apart from each other of 3.8 mm, and heated in water at a temperature of 60°C for 5 hours and then in air at a temperature of 120°C for 2 hours to produce a polymer plate. Flammability, oxygen index and deflection temperature of the products are shown in Table XII. The results shown in Table XII indicate that in order to obtain the same level of flame-resistance or oxygen index as is obtained in working Examples in accordance with the invention, far greater amounts of flame-retardants are required in these control Examples.

The above procedure was repeated except that one or both of the water and the flame-retardants were omitted. Flammability, oxygen index and deflection temperature of the products are shown in Table XIII. From the results shown in Table XIII, it can be seen that without the use of water the products have an inferior flame-resistance and a high water absorption when compared with those produced with the use of water.

Table XIII

| Example No. | Water (parts) | Trisdibromo-propyl phosphonate (parts) | Deflection temperature (°C) | Flammability according to ASTM D635-56T | | Oxygen index | Water absorption when held in water at 25°C for 1 month (%) |
| --- | --- | --- | --- | --- | --- | --- | --- |
| Control 7 | — | — | 103.0 | Burning | Burning rate 0.54 inches/m | 20.5 | 10.2 |
| Control 8 | — | 3 | 103.5 | Non-burning | Burning time 1'56" | 22.5 | 9.8 |
| Control 9 | — | 5 | 102.5 | ditto | Burning time <1" | 24.0 | 9.5 |
| Control 10 | — | 10 | 101.5 | ditto | Burning time <1" | 27.0 | 9.0 |
| 39 | 6.5 | 0 | 102.0 | ditto | Burning time <1" | 22.5 | 3.5 |
| 40 | 6.5 | 3 | 100.2 | ditto | Burning time <1" | 25.0 | 3.2 |
| 41 | 6.5 | 5 | 99.0 | ditto | Burning time <1" | 27.0 | 2.7 |
| 42 | 6.5 | 10 | 97.5 | ditto | Burning time <1" | 30.0 | 2.3 |

Table XII

| Control Example No. | Flame-retardant (parts) | | Deflection temperature (°C) | Flammability according to ASTM D635-56T | | Oxygen Index |
| --- | --- | --- | --- | --- | --- | --- |
| 2 | Trisdibromopropyl phosphate | 5 | 101.0 | Burning | Burning rate: 0.54 inch/m | 20.5 |
| 3 | ditto | 10 | 98.5 | Burning | Burning rate: 0.43 inch/m | 21.5 |
| 4 | ditto | 15 | 97.0 | Self-extinguishing | Self-extinguishing time: 2'27" | 22.5 |
| 5 | ditto | 20 | 95.0 | Non-burning | Burning time: 1'38" | 23.5 |
| 6 | ditto plus "Phosgard C-22-R" | 10 10 | 91.0 | Non-burning | Burning time: less than second | 24.0 |

EXAMPLES 39 – 42

A mixture of 30 parts of methacrylic acid, 50 parts of methyl methacrylate, 10 parts of acrylic amide, 10 parts of styrene, 6.5 parts of water, 3, 5 or 10 parts of trisdibromopropyl phosphate, 0.03 part of azobisisobutylonitrile and 0.5 part of butyl acid phosphate as a releasing agent was placed between two sheets of glass, and heated in water at a temperature of 50°C for 16 hours and then in air at temperature of 95°C for 2 hours to prepare a polymer plate of 3 mm thickness.

EXAMPLES 43 – 46

The general procedure as described in Examples 1 through 4 was repeated using a mixture of 35 parts of methacrylic acid, 47 parts of methyl methacrylate, 10 parts of acrylic amide, 8 parts of styrene, 7 parts of water and 0, 5, 10 or 15 parts of O,O,O',O'-tetrakis(2-bromo-3-chloropropyl)-2-bromopropylene bisphosphonate having the following formula (III):

III 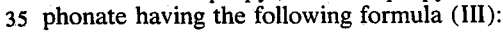

Properties of the products obtained are shown in Table XIV.

Table XIV

| Example No. | III (parts) | Deflection temperature (°C) | Optical properties TLT* (%) | Haze (%) | Oxygen index |
| --- | --- | --- | --- | --- | --- |
| 43 | 0 | 102.0 | 92.8 | 0.8 | 22.5 |
| 44 | 5 | 96.7 | 92.8 | 0.9 | 25.0 |
| 45 | 10 | 94.0 | 92.6 | 0.8 | 27.0 |
| 46 | 15 | 88.7 | 92.2 | 0.7 | 28.5 |

*TLT: Total luminous transmittance.

EXAMPLES 47 – 50

To a mixture of 35 parts of methacrylic acid, 47 parts of methyl methacrylate, 10 parts of acrylic amide, 8 parts of styrene, 7 parts of water, 0.02 part of azobis-2,4-dimethylvaleronitrile and 0.5 part of 2-ethylhexyl acid phosphate as a releasing agent, was added 1, 1.5, 2 or 3 parts, based on 100 parts of the mixture, of dioctyl sebacate. The resulting transparent, uniform mixture was placed between two sheets of glass spaced apart from each other by 3.8 mm, and heated in water at 58°C for 5 hours and in air at 100°C for 2 hours, whereby a polymer plate of 3.0 mm thickness was obtained. The products so obtained had a deflection temperature ranging from 102° to 107°C and an oxygen index of 22.5. Optical properties of these products are shown in Table XV below. All of them had an opal appearance and those products except that of Example 27, when employed as light covers, hindered visualization of the light source.

Table XV

| Example No. | Dioctyl sebacate (parts) | Optical properties Total luminous transmittance (%) | Diffusion* (%) |
| --- | --- | --- | --- |
| 47 | 1 | 69.2 | 58.2 |
| 48 | 1.5 | 56.2 | 73.2 |
| 49 | 2 | 54.2 | 73.4 |
| 50 | 3 | 51.6 | 73.2 |

*% Diffusion:

Quantities (a), (b) and (c) of transmitted light passing through the specimen deviate 5, 20 and 70 degrees, respectively, from the incident beam by forward scattering and are determined by an arbitrary instrument of measurement. From the values of (a), (b) and (c), % diffusion can be calculated as follows:

$$\% \text{ diffusion} = \frac{b+c}{2a} \times 100$$

EXAMPLES 51 – 56

Using each of the mixtures indicated in Table XVI below, the general procedure described in Examples 1 to 4 was repeated to prepare a polymer plate. In Table XVI, the amounts of dioctyl sebacate employed are based on 100 parts of the mixture. Properties of the products are also shown in the same Table.

As shown in Table XVI, all of the products obtained in these Examples had a total luminous transmittance and % diffusion well comparable with those of "Acrylite No. 432" (commercially available methyl methacrylate polymer plate supplied by Mitsubishi Rayon Co., Ltd.), and when they are employed as light covers, they hinder visualization of the source of light.

Similar results were obtained by following the above procedure with the exception that the dioctyl sebacate was replaced by the same amounts of dioctyl adipate.

Table XVI

| Example No. | Monomer composition | | | | | Trisdibromopropyl phosphate (parts) | Dioctyl sebacate (parts) | Deflection temperature (°C) | Optical properties | | Oxygen index |
| --- | --- | --- | --- | --- | --- | --- | --- | --- | --- | --- | --- |
| | Methacrylic acid (parts) | Methyl methacrylate (parts) | Styrene (parts) | Acrylic amide (parts) | Water (parts) | | | | TLT (%) | Diffusion | |
| 51 | 15 | 75 | — | 10 | 5 | — | 3 | 97.6 | 53.3 | 73.4 | 22.0 |
| 52 | 15 | 70 | 5 | 10 | 4 | — | 3 | 97.3 | 52.3 | 73.2 | 21.5 |
| 53 | 35 | 45 | 10 | 10 | 7 | — | 1.5 | 102.0 | 65.0 | 63.5 | 22.5 |
| 54 | 15 | 75 | — | 10 | 5 | 10 | 3 | 87.5 | 53.1 | 73.2 | 28.5 |
| 55 | 15 | 70 | 5 | 10 | 4 | 10 | 3 | 87.3 | 52.5 | 73.0 | 27.0 |
| 56 | 35 | 45 | 10 | 10 | 7 | 10 | 1.5 | 91.8 | 65.1 | 63.3 | 29.0 |
| Control "Acrylite No. 432" | | | | | | | | 101.0 | 58.3 | 65.2 | 18.0 |

EXAMPLES 57 – 60

A mixture of 16.5 parts of methacrylic acid, 67 parts of methyl methacrylate, 11 parts of acrylic amide, 5.5 parts of styrene, 4 parts of water and 0.05 part of azobisisobutyronitrile was placed in a flask equipped with a stirrer, and kept at a temperature of 65°C for 1 hour, while stirring and maintaining a nitrogen atmosphere in the flask. At the end of the period, the mixture had a viscosity of 1.2 poise (at 23°C) and comprised a partially polymerized polymer. To the partially polymerized polymer, were added 10 parts of trisdibromopropyl phosphate, 0.5 part of butyl acid phosphate, and 1.5, 2, 2.5 or 3 parts of dioctyl sebacate. The resulting mixture was subjected to a reduced pressure to remove any gas dissolved therein, placed in a mold comprising two parallel sheets of glass spaced apart from each other by 3.8 mm, and then heated in waer at a temperature of 65°C for 3 hours and in air at a temperature of 100°C for 2 hours to complete the polymerization.

The polymer plates so obtained had a deflection temperature of 88.0° to 90°C, an oxygen index of 27 to 28 and the optical properties as shown in Table XVII below.

Table XVII

| Example No. | Dioctyl sebacate (parts) | Optical properties Total luminous transmittance (%) | % Diffusion |
| --- | --- | --- | --- |
| 57 | 1.5 | 83.1 | 0.4 |
| 58 | 2 | 62.9 | 70.3 |
| 59 | 2.5 | 58.2 | 73.7 |
| 60 | 3 | 57.0 | 74.3 |

What we claim is:

1. A process for casting a methacrylic acid polymer plate of improved flame retarding and antistatic properties by a bulk polymerization procedure, which comprises polymerizing in an enclosed mold a mixture consisting essentially of
   A. methacrylic acid in an amount of 20 to 100% by weight based on the total weight of the monomer components (A), and (C), below,
   B. water in an amount of 0.1 to 1 mole per mole of methacrylic acid and at least 1 part by weight based on 100 parts by weight of the monomer components (A), and (C) below, and
   C. at least one ethylenically unsaturated compound copolymerizable with methacrylic acid and capable of forming a homogeneous, transparent solution when mixed with the components (A) and (B) at a temperature of 25°C, selected from the group consisting of
   C-i. alkyl acrylates and alkyl methacryles, both having 1 to 3 carbon atoms in the alkyl moiety, the amount of the monomer (C-i) being 0 to 80% by weight based on the total weight of the monomer components (A) and (C);
   C-ii. alkyl acrylates or methacrylates, the alkyl moiety having 4 to 12 carbon atoms, halogenated alkyl acrylates or methacrylates, the halogenated alkyl moiety having 2 or 3 carbon atoms, styrene and alkyl-substituted styrenes having 1 to 4 carbon atoms in the alkyl moiety, the amount of the monomer (C-ii) being 0 to 30% by weight based on the total weight of the monomer components (A) and (C);
   C-iii. acrylic acid, acrylamide, acrylonitrile, diacetone acrylamide, maleic acid and itaconic acid, the amount of the monomer (C-iii) being 0 to 80% by weight based on the total weight of the monomer components (A) and (C); and
   C-iv. methacrylic amide, methacrylonitrile, N-hydroxymethylacrylic amide, 2-hydroxyethyl methacrylate, 2-hydroxyethyl acrylate, glycidyl methacrylate, dimethylaminoethyl methacrylate, diethylaminoethylmethacrylate, N-alkylmaleimide, N-arylmaleimide and metal salts of methacrylic acid or acrylic acid, the amount of the monomer (C-iv) being 0 to 20% by weight based on the total weight of the monomer components (A) and (C), and, optionally 1 to 25 parts by weight, based on 100 parts by weight of the monomer components (A) and (C), of at least one compound selected from the group consisting of trialkyl phosphates, the alkyl moiety having 1 to 8 carbon atoms, triaryl phosphates, the aryl moiety having 6 to 14 carbon atoms, tris-halogenated alkyl phosphates, the alkyl moiety having 2 to 6 carbon atoms, tris-halogenated alkyl phosphonates, the alkyl moiety having 2 to 6 carbon atoms, and halogenated alkyl polyphosphonates, the alkyl moiety having 2 to 6 carbon atoms.

2. A process according to claim 1, wherein said mixture further contains 1 to 8 parts by weight, based on the total weight of said mixture, of at least one compound selected from the group consisting of dialkyl esters of phthalic acid, having 20 to 34 carbon atoms in the molecule, dialkyl esters of dibasic fatty acid, having 18 to 36 carbon atoms in the molecule, and alkyl esters of monobasic fatty acid, having 20 to 40 carbon atoms in the molecule.

3. A process according to claim 1 wherein said mixture further contains 0.01 to 5% by weight, based on the total weight of the monomer components (A) and (C), of at least one copolymerizable compound having at least two ethylenical unsaturations in the molecule.

4. A process according to claim 1, wherein said mixture is charged into the mold together with a catalytic amount of a polymerization initiator and then heated at temperatures of 40° to 120°C over a period of 20 minutes to 20 hours to effect the polymerization.

5. A process according to claim 1, wherein
   component (A) comprises methacrylic acid in an amount of 20 to 70% by weight based on the total weight of the monomer components (A) and (C),
   component (B) comprises water in an amount of 0.1 to 1 mole per mole of methacrylic acid and at least 1 part by weight based on 100 parts by weight of the monomer components (A) and (C), and
   component (C-i) comprises methyl methacrylate in an amount of 30 to 80% by weight based on the total weight of the monomer components (A) and (C).

6. A process according to claim 5, wherein said mixture further contains 1 to 8 parts by weight, based on the total weight of said mixture, of at least one compound selected from the group consisting of dialkyl esters of phthalic acid, having 20 to 34 carbon atoms in the molecule, dialkyl esters of dibasic fatty acid, having 18 to 36 carbon atoms in the molecule, and alkyl esters of monobasic fatty acid, having 20 to 40 carbon atoms in the molecule.

7. A process according to claim 1, wherein the mixture to be polymerized comprises
   A. methacrylic acid in an amount of 20 to 60% by weight based on the total weight of the monomer components (A), and (C-1), (C-2) and (C-3) below,
   B. water in an amount of 0.1 to 1 mole per mole of methacrylic acid and at least 1 part by weight based on 100 parts by weight of the monomer components (A), and (C-1), (C-2) and (C-3) below,
   C-1. methyl methacrylate in an amount of 30 to 65% by weight based on the total weight of the monomer components (A), (C-1), and (C-2) and (C-3) below,
   C-2. acrylic amide in an amount of 3 to 15% by weight based on the total weight of the monomer components (A), (C-1), (C-2) and (C-3 ) below, and
   C-3. styrene in an amount of 3 to 15% by weight based on the total weight of the monomer components (A), (C-1), (C-2) and (C-3).

8. A process for casting a methacrylic acid polymer plate of improved flame retarding and antistatic properties by a bulk polymerization procedure, which comprises enclosing in a mold a mixture consisting essentially of
   A. methacrylic acid in an amount of 20 to 100% by weight based on the total weight of the monomer components (A), and (C) below;
   B. water in an amount of 0.1 to 1 mole per mole of methacrylic acid and at least 1 part by weight based on 100 parts by weight of the monomer components (A), and (C) below;
   C. at least one copolymerizable ethylenically unsaturated compound capable of forming a homogeneous, transparent solution when mixed with methacrylic acid and water at a temperature of 25°C selected from the group consisting of C-i. alkyl acrylates and alkyl methacryles, both having 1 to 3 carbon atoms in the alkyl moiety, the amount of the monomer (C-i) being 0 to 80% by weight based on the total weight of the monomer components (A) and (C);

C-ii. alkyl acrylates or methacrylates, the alkyl moiety having 4 to 12 carbon atoms, halogenated alkyl acrylates or methacrylates, the halogenated alkyl moiety having 2 or 3 carbon atoms, styrene and alkyl-substituted styrenes having 1 to 4 carbon atoms in the alkyl moiety, the amount of the monomer (C-ii) being 0 to 30% by weight based on the total weight of the monomer components (A) and (C);

C-iii. acrylic acid, acrylamide, acrylonitrile, diacetone acrylamide, maleic acid and itaconic acid, the amount of the monomer (C-iii) being 0 to 80% by weight based on the total weight of the monomer components (A) and (C), and C-iv. methacrylic amide, methacrylonitrile, N-hydroxymethylacrylic amide, 2-hydroxyethyl methacrylate, 2-hydroxyethyl acrylate, glycidyl methacrylate, dimethylaminoethyl methacrylate, diethylaminoethylmethacrylate, N-alkylmaleimide, N-arylmaleimide and metal salts of methacrylic acid or acrylic acid, the amount of the monomer (C-iv) being 0 to 20% by weight based on the total weight of the monomer components (A) and (C), D. 1 to 25 parts by weight, based on 100 parts by weight of the monomer components (A) and (C), of at least one compound selected from the group consisting of trialkyl phosphates, the alkyl moiety having 1 to 8 carbon atoms, triaryl phosphates, the aryl moiety having 6 to 14 carbon atoms, tris-halogenated alkyl phosphates, the alkyl moiety having 2 to 6 carbon atoms, tris-halogenated alkyl phosphonates, the alkyl moiety having 2 to 6 carbon atoms, and halogenated alkyl polyphosphonates, the alkyl moiety having 2 to 6 carbon atoms, and E. a catalytic amount of a polymerization initiator; and then heating the mixture in the mold to effect polymerization in the presence of said water.

9. A method according to claim 8 wherein polymerization is effected by heating at a temperature of from 40° to 120°C over a period of from 20 minutes to 20 hours.

10. A process according to claim 8 wherein said composition includes 0.1 to 6.0% by weight, based on the total weight of the monomer components, of an alkyl acid phosphate having 2 to 12 carbon atoms in the alkyl moiety.

11. A process according to claim 8, wherein said mixture consists essentially of A. methacrylic acid in an amount of 20 to 70% by weight based on the total weight of the monomer components (A) and (C-1) and (C-2) below, B. water in an amount of 0.1 to 1 mole per mole of methacrylic acid and at least 1 part by weight based on 100 parts by weight of the monomer components (A) and (C-1) and (C-2) below, C-1. methyl methacrylate in an amount of 30 to 80% by weight based on the total weight of the monomer components (A), (C-1) and (C-2) below, C-2. at least one copolymerizable ethylenically unsaturated compound selected from the group recited in claim 2, (C-i), (C-ii), (C-iii) and (C-iv), except for methyl methacrylate, the amount of said ethylenically unsaturated compound being the same as defined in claim 19, (C-i), (C-ii), (C-iii) and (C-iv), D. 1 to 25 parts by weight, based on 100 parts by weight of the monomer components (A), (C-1) and (C-2), of at least one compound selected from the group consisting of trialkyl phosphates, the alkyl moiety having 1 to 8 carbon atoms, triaryl phosphates, the aryl moiety having 6 to 14 carbon atoms, tris-halogenated alkyl phosphates, the alkyl moiety having 2 to 6 carbon atoms, tris-halogenated alkyl phosphonates, the alkyl moiety having 2 to 6 carbon atoms, and halogenated alkyl polyphosphonates, the alkyl moiety having 2 to 6 carbon atoms, and E. a catalytic amount of a polymerization initiator.

12. A process according to claim 8, wherein said mixture consists essentially of A. methacrylic acid in an amount of 20 to 60% by weight based on the total weight of the monomer components (A), and (C-1), (C-2) and (C-3) below, B. water in an amount of 0.1 to 1 mole per mole of methacrylic acid and at least 1 part by weight based on 100 parts by weight of the monomer components (A), and (C-1), (C-2) and (C-3) below, C-1. methyl methacrylate in an amount of 30 to 65% by weight based on the total weight of the monomer components (A), (C-1), and (C-2) and (C-3) below, C-2. acrylic amide in an amount of 3 to 15% by weight based on the total weight of the monomer components (A), (C-1), (C-2) and (C-3) below, and C-3. styrene in an amount of 3 to 15% by weight based on the total weight of the monomer components (A), (C-1), (C-2) and (C-3), D. 1 to 25 parts by weight, based on 100 parts by weight of the monomer components (A), (C-1), (C-2) and (C-3), of at least one compound selected from the group consisting of trialkyl phosphates, the alkyl moiety having 1 to 8 carbon atoms, triaryl phosphates, the aryl moiety having 6 to 14 carbon atoms, trishalogenated alkyl phosphates, the alkyl moiety having 2 to 6 carbon atoms, tris-halogenated alkyl phosphonates, the alkyl moiety having 2 to 6 carbon atoms, and halogenated alkyl polyphosphonates, the alkyl moiety having 2 to 6 carbon atoms, and E. a catalytic amount of a polymerization initiator.

13. A process according to claim 8 wherein said halogenated alkyl phosphonates are (1) halogenated alkyl bisphosphonates expressed by the formula

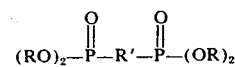

wherein R is a halogenated alkyl having 2 to 3 carbon atoms and R' is an alkylene or halogenated alkylene having 2 or 3 carbon atoms, or (2) halogenated alkyl polyphosphonates expressed by the formula

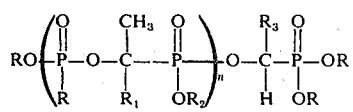

wherein R and $R_2$ are chloroethyl or chloroisopropyl, $R_1$ is hydrogen, methyl or ethyl, $R_3$ is methyl or ethyl and n is an integer of 1 to 100.

14. A process for casting a methacylic acid polymer plate of improved flame retarding and antistatic properties by a bulk polymerization procedure, which comprises enclosing in a mold a mixture consisting essentially of
  A. methacrylic acid in an amount of 20 to 100% by weight based on the total weight of the monomer components (A), and (C) below,
  B. water in an amount of 0.1 to 1 mole per mole of methacrylic acid and at least 1 part by weight based on 100 parts by weight of the monomer components (A), and (C) below;
  C. at least one copolymerizable ethylenically unsaturated compound capable of forming a homogeneous, transparent solution when mixed with methacrylic acid and water at a temperature of 25°C selected from the group consisting of
  C-i. alkyl acrylates and alkyl methacryles, both having 1 to 3 carbon atoms in the alkyl moiety and the amount of the monomer (C-i) being 0 to 80% by weight based on the total weight of the monomer components (A) and (C),
  C-ii. alkyl acrylates or methacrylates, the alkyl moiety having 4 to 12 carbon atoms, halogenated alkyl acrylates or methacrylates, the halogenated alkyl moiety having 2 or 3 carbon atoms, styrene and alkyl-substituted styrenes having 1 to 4 carbon atoms in the alkyl moiety; and the amount of the monomer (C-ii) being 0 to 30% by weight based on the total weight of the monomer components (A) and (C),
  C-iii. acrylic acid, acrylamide, acrylonitrile, diacetone acrylamide, maleic acid and itaconic acid, the amount of the monomer (C-iii) being 0 to 80% by weight based on the total weight of the monomer components (A) and (C), and
  C-iv. methacrylic amide, methacrylonitrile, N-hydroxymethylacrylic amide, 2-hydroxyethyl methacrylate, 2-hydroxyethyl acrylate glycidyl methacrylate, dimethylaminoethyl methacrylate, diethylaminoethyl methacrylate, N-alkylmaleimide, N-arylmaleimide and metal salts of methacrylic acid or acrylic acid, the amount of the monomer (C-iv) being 0 to 20% by weight based on the total weight of the monomer components (A) and (C),
  D. 0.1 to 6.0% by weight, based on the total weight of the monomer components, of an alkyl acid phosphate having 2 to 12 carbon atoms in the alkyl moiety, and
  E. a catalytic amount of a polymerization initiator; and then
    heating the mixture in the mold to effect polymerization in the presence of said water 15. A process for casting a methacrylic acid polymer plate of improved flame retarding and antistatic properties by a bulk polymerization procedure, which comprises enclosing in a mold a mixture consisting essentially of
  A. methacrylic acid in an amount of 20 to 60% by weight based on the total weight of the monomer components (A), and (C-1), (C-2) and (C-3) below,
  B. water in an amount of 0.1 to 1 mole per mole of methacrylic acid and at least 1 part by weight based on 100 parts by weight of the monomer components (A), and (C-1), (C-2) and (C-3) below,
  C-1. methyl methacrylate in an amount of 30 to 65% by weight based on the total weight of the monomer components (A), (C-1), and (C-2) and (C-3) below,
  C-2. acrylic amide in an amount of 3 to 15% by weight based on the total weight of the monomer components (A), (C-1), (C-2) and (C-3) below; and
  C-3. styrene in an amount of 3 to 15% by weight based on the total weight of the monomer components (A), (C-1), (C-2) and (C-3),
  D. 1 to 25 parts by weight, based on 100 parts by weight of the monomer components (A), (C-1), (C-2) and (C-3) of at least one compound selected from the group consisting of trialkyl phosphates, the alkyl moiety having 1 to 8 carbon atoms, triaryl phosphates, the aryl moiety having 6 to 14 carbon atoms, tris-halogenated alkyl phosphates, the alkyl moiety having 2 to 6 carbon atoms, tris-halogenated alkyl phosphonates, the alkyl moiety having 2 to 6 carbon atoms, and halogenated alkyl polyphosphonates, the alkyl moiety having 2 to 6 carbon atoms,
  E. a catalytic amount of a polymerization initiator, and
  F. 1 to 8 parts by weight, based on the total weight of the components (A), (B), (C-1), (C-2), (C-3) and (D) of at least one compound selected from the group consisting of dialkyl esters of phthalic acid, having 20 to 34 carbon atoms in the molecule, dialkyl esters of dibasic fatty acid, having 18 to 36 carbon atoms in the molecule, and alkyl esters of monobasic fatty acid, having 20 to 40 carbon atoms in the molecule; and then
  heating the mixture in the mold to effect polymerization in the presence of said water.

16. A process for casting a methacrylic acid polymer plate of improved flame retarding and antistatic properties by a bulk polymerization procedure, which comprises enclosing in a mold a mixture consisting essentially of
  A. methacrylic acid in an amount of 10 to 60% by weight based on the total weight of the monomer components (A), and (C-1) (C-2) and (C-3) below,
  B. water in an amount of 1 to 14.6 parts by weight based on 100 parts by weight of the monomer components (A), and (C-1), (C-2) and (C-3) below,
  C-1. methyl methacrylate in an amount of 30 to 80% by weight based on the total weight of the monomer components (A), (C-1) and (C-2), and (C-3), below,
  C-2. acrylic amide in an amount of 3 to 15% by weight based on the total weight of the monomer components (A), (C-1), (C-2) and (C-3) below,
  C-3. styrene in an amount of 0 to 15% by weight based on the total weight of the monomer components (A), (C-1), (C-2) and (C-3), D. at least one compound selected from the group consisting of trialkyl phosphates, the alkyl moiety having 1 to 8 carbon atoms, triaryl phosphates, the aryl moiety having 6 to 14 carbon atoms, tris-halogenated alkyl phosphates, the alkyl moiety having 2 to 6 carbon atoms, tris-halogenated alkyl phosphonates, the alkyl moiety having 2 to 6 carbon atoms, and halogenated alkyl polyphosphonate, the alkyl moiety having 2 to 6 carbon atoms, in an amount of 1 to 25 parts by weight based on 100 parts by weight of the monomer components (A), (C-1) (C-2) (C-3), and E. a catalytic amount of a polymerization initiator; and then heating the mixture in the mold to effect polymerization.

17. A process according to claim 16, wherein said halogenated alkyl polyphosphonates are (1) halogenated alkyl bisphosphonates expressed by the formula

wherein R is halogenated alkyl having 2 or 3 carbon atoms and R' is an alkylene or halogenated alkylene having 2 or 3 carbon atoms, or (2) halogenated alkyl polyphosphonates expressed by the formula

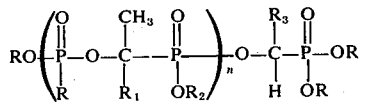

wherein R and $R_2$ are chloroethyl or chloroisopropyl, $R_1$ is hydrogen, methyl or ethyl, $R_3$ is methyl or ethyl and $n$ is an integer of 1 to 100.

18. A process for casting a methacrylic acid polymer plate of improved flame retarding and antistatic properties by a bulk polymerization procedure, which comprises enclosing in a mold a mixture consisting essentially of A. methacrylic acid in an amount of 10 to 60% by weight based on the total weight of the monomer components (A), and (C-1), (C-2) and (C-3) below, B. water in an amount of 1 to 14.6 parts by weight based on 100 parts by weight of the monomer components (A), and (C-1), (C-2) and (C-3) below, C-1. methyl methacrylate in an amount of 30 to 80% by weight based on the total weight of the monomer components (A), (C-1) and (C-2), and (C-3) below, C-2. acrylic amide in an amount of 3 to 15% by weight based on the total weight of the monomer components (A), (C-1), (C-2) and (C-3) below, C-3. styrene in an amount of 0 to 15% by weight based on the total weight of the monomer components (A), (C-1), (C-2) and (C-3), D. at least one compound selected from the group consisting of trialkyl phosphates, the alkyl moiety having 1 to 8 carbon atoms, triaryl phosphates, the aryl moiety having 6 to 14 carbon atoms, tris-halogenated alkyl phosphates, the alkyl moiety having 2 to 6 carbon atoms, tris-halogenated alkyl phosphonates, the alkyl moiety having 2 to 6 carbon atoms, and halogenated alkyl polyphosphonate, the alkyl moiety having 2 to 6 carbon atoms, in an amount of 1 to 25 parts by weight based on 100 parts by weight of the monomer components (A), (C-1), (C-2) and (C-3), E. a catalytic amount of a polymerization initiator, and F. 1 to 8 parts by weight, based on the total weight of the components (A), (B), (C-1), (C-2), (C-3) and (D), of at least one compound selected from the group consisting of dialkyl esters of phthalic acid, having 20 to 34 carbon atoms in the molecule, dialkyl esters of dibasic fatty acid, having 18 to 36 carbon atoms in the molecule, and alkyl esters of monobasic fatty acid, having 20 to 40 carbon atoms in the molecule; and then heating the mixture in the mold to effect polymerization in the presence of said water.

* * * * *